(No Model.)
2 Sheets—Sheet 1.
F. G. HESSE.
FLUID METER.
No. 282,985. Patented Aug. 14, 1883.
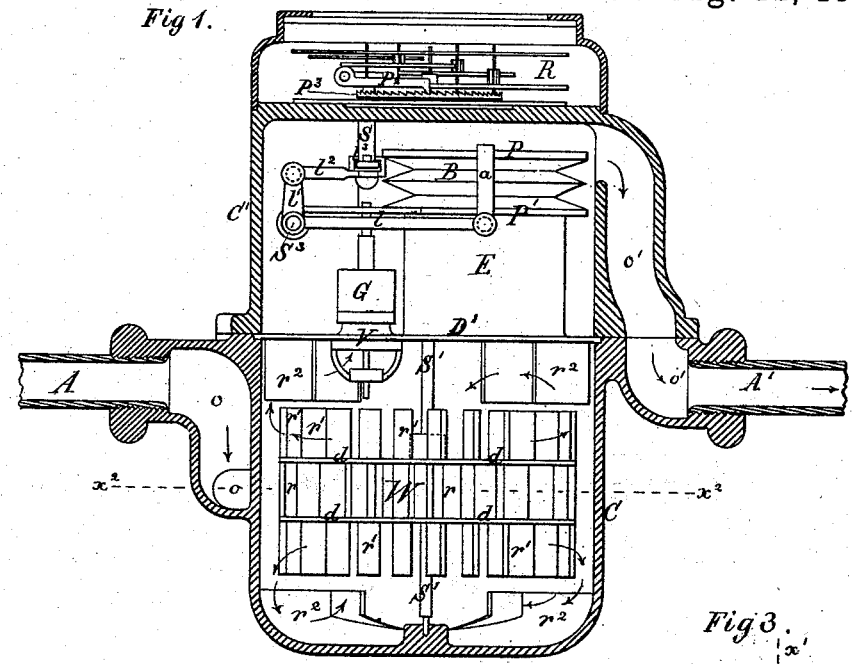
Witnesses:
B. C. Fenwick
Robt. L. Fenwick
Inventor:
Frederick G. Hesse
by his atty
Fenwick & Lawrence
N. PETERS. Photo-Lithographer, Washington, D. C.

(No Model.)  2 Sheets—Sheet 2.

F. G. HESSE.
FLUID METER.

No. 282,985.  Patented Aug. 14, 1883.

Witnesses:
B. C. Fenwick.
Robt L Fenwick

Inventor:
Frederick G. Hesse
by his atty
Fenwick & Lawrence

N. PETERS, Photo-Lithographer, Washington, D. C.

UNITED STATES PATENT OFFICE.

FREDERICK G. HESSE, OF OAKLAND, CALIFORNIA.

FLUID-METER.

SPECIFICATION forming part of Letters Patent No. 282,985, dated August 14, 1883.

Application filed January 2, 1883. (No model.)

*To all whom it may concern:*

Be it known that I, FREDERICK G. HESSE, a citizen of the United States, residing at Oakland, in the county of Alameda and State of California, have invented a new and useful Improvement in Fluid-Meters, of which the following is a specification.

My invention relates specially to meters for measuring water by its velocity and force under pressure of a "head;" and the object of the same is to have such meter fulfill, as far as practicable, the following conditions: first, be capable of registering the quantity of water flowing through it with approximate accuracy, and maintaining such a result whether the quantity of water be either very large or so small as to correspond, say, to a flow at the rate of one gallon in from ten to thirty minutes; second, shall possess durability by having its wear from friction or other cause reduced to a minimum; and, third, shall be comparatively cheap as regards cost of construction. I attain these objects by constructing a "velocity-meter," so called, in contradistinction to a volume-meter, adopting in its construction the devices illustrated in the accompanying drawings, in which—

Figure 5:
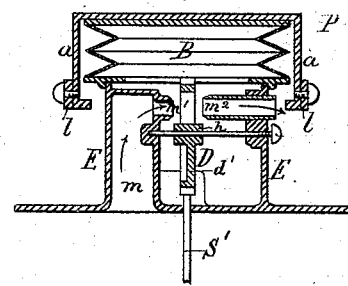
Figure 6:
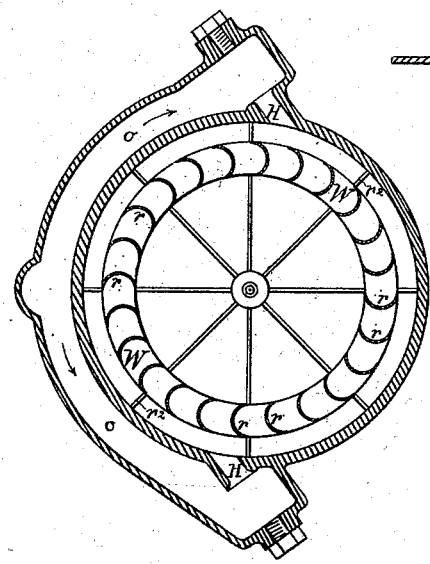
Figure 7:
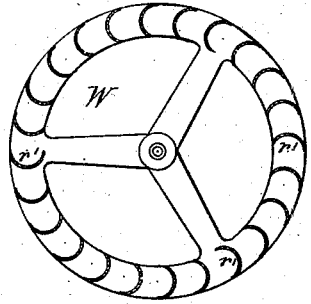
Figure 8:
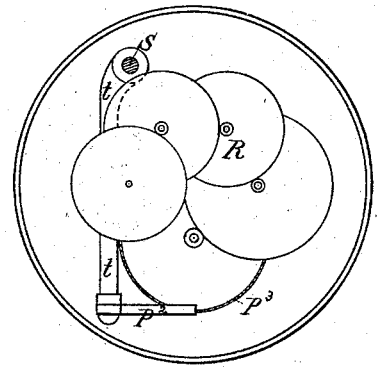

Figure 1 is a vertical central section of the meter-case, exposing to view the interior works in part. Fig. 2 is a top view, showing the dial-plate and the outer case of the meter. Fig. 3 is a top view of the devices contained in the upper water-chamber. Fig. 4 is a vertical central section on line $x$ $x$ of Fig. 3 through chamber E and flexible diaphragm B, showing the interior construction and mechanism thereof. Fig. 5 is a central vertical section on line $x'$ $x'$ of Fig. 3. Fig. 6 is a horizontal section on line $x^2$ $x^2$ of Fig. 1. Fig. 7 is a top view of the measuring water-wheel W, and Fig. 8 is a top view of the registering-works.

The cylindrical case of the meter consists of two parts, C and C', which are united by means of flanges and bolts, as illustrated in Figs. 1 and 2. The space inclosed by said parts C and C' is divided by a horizontal plate, D', into two water-chambers, C forming a lower water-chamber, and C' an upper water-chamber. These chambers communicate with each other by means of a passage, V', which may or may not be closed by a valve, V, and by another passage-way, as at $m$ $m'$ $m^2$, as will be hereinafter described.

The service or supply pipe A communicates with the lower water-chamber by means of a conduit, $o$, (see Figs. 1 and 6,) and openings H H, while the discharge-pipe A' communicates with the upper water-chamber by means of a conduit, $o'$, which latter affords a free escape of the water. The lower chamber contains a measuring water-wheel, W, made to revolve about a vertical shaft or spindle, S'. This wheel is similar in construction to a tangential or impact wheel, and is acted upon by the two jets of water issuing forcibly from openings H and striking its buckets $r$ $r$, as shown in Figs. 1 and 6. The top and bottom plates, $d$ $d$, of the wheel are provided with buckets $r'$ $r'$ similar to those $r$ of the wheel, but reversed in position relatively thereto, so that the water which gets in their way shall tend to retard the speed of the wheel produced by the direct action and force upon the buckets $r$. I provide buckets $r'$ both below and above the buckets $r$, and make all of the buckets $r$ and $r'$ curved, in order to produce the most accurate results, as will be hereinafter described. In connection with the buckets $r'$ of the wheel W stationary wings $r^2$ are provided, these being attached to the bottom part, C, of the case and to the under side of the horizontal plate D' thereof, as shown. To avoid friction of the step in which the shaft S' of the wheel rests, all parts of the wheel, including buckets and shaft, are preferably made of vulcanized gutta-percha, as the specific gravity of this material is about that of water.

The upper water-chamber, C, contains a cylinder or vessel, E, which is closed at its top by an elastic bellows-like device or diaphragm, B, said device consisting of corrugated rubber or other flexible material between metal plates P P', as shown. The lower plate, P', Figs. 1, 4, and 5, is fastened to the top edge of cylinder E, and through it an annular opening is formed, whereby communication with said cylinder is secured. The bottom of cylinder E is closed with the exception of the opening or passage $m$, which communicates with interior of cylinder E by means of a small circular opening, $m'$, as shown in Fig. 5. Communication between cylinder E and the upper water-chamber is established by means of the small conical opening or passage $m^2$. This opening or passage $m^2$ is the discharge from the cylinder E, while the openings or passages $m$ and $m'$ are the inlets to the same. Both openings or passages $m'$ and $m^2$ have the same axis in common, while the area of the opening or passage $m^2$ is about twice as great as that of $m'$. Under the peculiar construction and operation of my meter, as will be hereinafter described, the diaphragm B will be caused periodically to rise, and then allowed to descend by reason of an intermittent interruption of the direct flow of the water through the cylinder E. The spindle $S'$ of the water-wheel W extends up into the cylinder E, and carries on its upper end an endless screw, $S^2$, (see Fig. 4,) which gears into a worm-wheel, D. The rim of the wheel D is connected to the hub $h$ by means of a sector or semicircular plate $d'$, (see Figs. 4 and 5,) which stands vertically between the nozzle ends of the openings or passages $m'$ $m^2$, being a slight distance away from each of said ends, and in its revolution with the wheel D it acts intermittently as a water interrupting and diverging diaphragm between these openings or passages, while it does not completely close either of them. The wheel D is open from side to side between the other portion of its rim and the upper or straight edge of the diaphragm sector-plate $d'$. This device of the diaphragm sector-plate $d'$ is such that each half-revolution of the worm-wheel D will either break the direct communication across from opening or passage $m'$ to opening or passage $m^2$—that is, turn downward or upward the jet of water issuing from passage $m'$, and thereby insure the desired operation of the meter—or leave the current to flow directly across from opening or passage $m'$ to opening or passage $m^2$ through the opening in the wheel D.

The top P of the bellows-like device or diaphragm B, Fig. 5, carries two vertical rods, $a\ a$, which are pivoted to curved horizontal lever-arms $l\ l$, Figs. 1 and 3, attached to a rock-shaft, $S^3$, hung in a bracket of plate $P'$, said rock-shaft having a lever-arm, $l'$, fastened rigidly to it.

S represents a vertical shaft, which passes through a stuffing-box into a chamber, R, which contains the registering mechanism. To this shaft S a lever-arm, $l^3$, is attached, and the end of this arm is connected by rod $l^2$ to the lever-arm $l'$ of the rock-shaft $S^3$. By means of the flexible diaphragm B and the mechanism between it and the shaft S, a reciprocating motion is imparted to said shaft S as the plate P of the diaphragm B moves up and down, which up-and-down movement is due to the intermittent change in pressure of the water in cylinder E, caused by the intermittent action of the sector-plate $d'$. That end of shaft S which passes through the meter-case into chamber R has attached to it a lever, $t$, Fig. 8, which, in connection with the pawl $P^2$ and ratchet-wheel $P^3$, imparts rotary motion to the index-wheels and dial-hands of the meter, and thus effects the registration of the water.

The worm $S^2$ and the wheel D, with its sector-plate $d'$, are preferably made of gutta-percha, so as to have them of about the same specific gravity of the water.

In Fig. 1 I have represented the passage $V'$ as being closed by a valve, V, and on the stem of this valve a weight, G, is shown. This weight is slipped upon the stem, and can be substituted by a lighter or a heavier one, accordingly as the flow or head of water may require. The valve V is only needed for small quantities of water in order to produce sufficient pressure to compel the water—that is, a portion of the same or all—to flow through passage-way $m\ m'\ m^2$. For large quantities of water flowing through the meter, a mere passage, $V'$, Fig. 4, without weighted valve, will be sufficient, since the relative size of this passage or opening produces the necessary difference of pressures to cause the water, in part, to flow through passage-way $m\ m'\ m^2$.

The operation is as follows: The meter being fitted in position, the water from supply-pipe A flows through conduit $o$ and openings H in two forcible jets, which revolve the wheel W. The water discharged from the buckets $r$ of the wheel is caused to rotate by the top and bottom buckets, $r'\ r'$, acting upon it in conjunction with the upper and lower sets of stationary wings, $r^2 r^2$, and consequently is caused by centrifugal action to circulate, as indicated by the arrows. The resistance offered by the water to the buckets $r'\ r'$, which are reversely set with respect to the buckets $r\ r$, is similar to that of a centrifugal pump—that is, retarding the motion of the wheel, so that its velocity will be about one-tenth the velocity of the water issuing from the openings H. It will be understood that the buckets $r$ are under the direct head-force of the water, while the buckets $r'\ r'$ are above and below such force, and hence the revolution of the wheel W will only be regulated and retarded by the buckets $r'\ r'$ in a proper manner. The accuracy with which the meter registers the water increases, it is found by test, with the pressure or impact of the jet against the buckets $r$, provided that the resisting action of the water in which the wheel W revolves is made proportionate with the impact or pressure. For these reasons I have substituted curved buckets for radial wings, and introduced a great number, providing buckets $r'\ r'$ both above and below the buckets $r$, and thus increase the resisting action of the water, as above described. The water in circulating passes from the lower chamber formed by C to the upper chamber (through passage $V'$) formed by $C'$, and also through the passage-way $m\ m'\ m^2$, Fig. 5. The relative quantity of water which flows through the passage-way $m\ m'\ m^2$ can be regulated, if desired, by the use of the weighted valve V, so that a given difference of pressure between the lower chamber, C, and upper chamber, C', may be sustained, and so that an increase of the size of weight G will cause an increase of flow of water through passage-way $m\ m'\ m^2$; and for a given small quantity of water flowing through the meter, the valve will remain closed and all the water be discharged through the passage-way $m\ m'\ m^2$. As the weight G is made to slide on the valve-rod, it can readily be changed from a light to a heavier one, as may be necessary. While the wheel W is rotating, a slight rotary motion will be imparted to wheel D and sector-plate $d'$ in chamber E, and in each revolution of wheel D the direction of the current issuing from passage $m'$ will be changed during one-half of said revolution of said wheel by the sector-plate $d'$. If the passage-way between the nozzles of openings or passages $m'$ and $m^2$ is free or uninterrupted by reason of the sector-plate $d'$ being in the position shown in Figs. 4 and 5, the pressure of water in cylinder or vessel E will be such that the diaphragm B will not be caused to rise, but the reverse will be the case if the said passage-way between the openings or passages $m'\ m^2$ has the sector-diaphragm $d'$ turned into it, as herein described. Thus, for each revolution of the wheel D and the sector-plate $d'$, the difference of water-pressure in cylinder E and chamber C' will cause plate P of diaphragm B to rise once and descend once, and the reciprocating motion thus produced will be transmitted to the registering mechanism and converted into rotary motion, as herein described. The pressure on plate P of diaphragm B, either during its up or down stroke, increases with the quantity of water flowing through openings or passages $m'\ m^2$, and this can be readily controlled by means of proper-sized weight G on valve V.

In my meter the pressure in vessel E, caused by the divergence or interruption of the direct flow of the current from opening or passage $m'$ to opening or passage $m^2$, by the interference intermittently of the sector-plate $d'$, can be increased by placing the sector-plate so that it will move very near the opening or passage $m^2$, and thereby obstruct the rapid direct passage out of cylinder E of the water to a greater extent than it did when it was farther away from passage $m^2$, and in such case the upstroke of plate P of diaphragm B will be capable of overcoming greater resistance than its downstroke, and as the resistance of the stuffing-box remains the same, this plate P of diaphragm B will be made of sufficient weight to equalize the force of the up and down strokes. Thus it will be seen that the friction caused by the stuffing-box and registering mechanism does not offer any serious resistance to the rotation of water-wheel W, which revolves under jets of water from openings H independently of the work done in driving the registering mechanism, and yet having its revolutions registered with the same precision as if it were geared to or connected with said mechanism.

In the meter represented every rotation of the wheel D in vessel E corresponds to one-fifth of a cubic foot. The ratchet-wheel $P^3$ has fifty teeth, and hence each revolution indicates ten (10) cubic feet. If the rate of the flow of the water corresponds to one gallon in twenty (20) minutes, the meter still registers with sufficient accuracy. If the meter discharges water at the rate of one cubic foot per minute, the loss of head is about four and one-half feet.

As an equivalent of the elastic diaphragm B or bellows-like device, a cylinder with a piston may be adopted.

What I claim as my invention, and desire to secure by Letters Patent, is—

1. In a fluid-meter, a revolving wheel, D, provided with a device, as $d'$, whereby the direct course of a portion of the water in its passage through the meter is intermittently interrupted, substantially as described.

2. A fluid-meter provided with chambers C C' and cylinder or vessel E, the chambers C C' being placed in communication with each other by a passage, as V', while the vessel or cylinder E is made to communicate with chambers C C' by passages, as $m\ m'\ m^2$, substantially as and for the purpose described.

3. A fluid-meter having chambers C C' and cylinder or vessel E, which are placed in communication by openings or passages V' and $m\ m'\ m^2$, provided with a weighted valve, as V, substantially as and for the purpose described.

4. In a fluid-meter provided with chambers C C' and cylinder or vessel E, placed in communication by openings or passages V' $m\ m'\ m^2$, or their equivalents, the combination of a measuring water-wheel, W, a worm, $S^2$, worm-wheel D, having sector-plate $d'$, diaphragm B, or its equivalent, and mechanism for transmitting the movements of diaphragm B to registering mechanism, substantially as and for the purpose described.

5. The combination of the cylinder or vessel E, provided with passages or openings $m'\ m^2$, and revolving wheel D, having sector-plate $d'$, substantially as and for the purpose described.

6. The vessel or cylinder E, provided with passages or openings $m'\ m^2$, and the revolving wheel D, having sector-plate $d'$, in combination with a passage or an opening, V', and a water-wheel, W, or its equivalent, substantially as and for the purpose described.

7. The combination of cylinder or vessel E, passages or openings $m'\ m^2$, worm-wheel D, carrying sector-plate $d'$, elastic diaphragm B, or its equivalent, water-wheel W, having worm $S^2$ on its shaft, weighted valve V, and suitable connecting mechanism between the diaphragm and registering mechanism, substantially as and for the purpose described.

8. Cylinder or vessel E, passages or openings $m'$ $m^2$, and revolving sector $d'$, in combination with an elastic diaphragm, or its equivalent, substantially as and for the purpose described.

9. The combination, with the wheel W, having curved buckets $r$, of stationary ribs $r^2$ $r^2$ and two sets of curved buckets $r'$ $r'$, one set being applied on one side and the other set on the opposite side of the wheel, and both sets placed in reverse position with respect to buckets $r$, substantially as and for the purpose described.

FREDERICK G. HESSE.

Witnesses:
 GUSTAV L. MIX,
 ROSS E. BROWNE.